March 11, 1969  M. O. SEAY  3,432,215

ROLLER BEARING FOR DIGGING WHEEL OF EXCAVATING MACHINERY

Filed Sept. 22, 1966

INVENTOR
MARK O. SEAY

BY John A. Mawhinney
ATTORNEY

United States Patent Office 3,432,215
Patented Mar. 11, 1969

3,432,215
ROLLER BEARING FOR DIGGING WHEEL OF EXCAVATING MACHINERY
Mark O. Seay, Eunice, N. Mex.
(Star Rte. A, Box 227, Hobbs, N. Mex. 88240)
Filed Sept. 22, 1966, Ser. No. 581,315
U.S. Cl. 308—187  3 Claims
Int. Cl. F16c 33/78, 33/66; E02f 3/22

ABSTRACT OF THE DISCLOSURE

The disclosure of this invention pertains to a supporting bearing structure for mounting the digging wheel of an excavating machine including an axle having wheels thereon with a lubricant reservoir on the axle between the wheels, anti-friction bearing devices disposed between the axle and the reservoir and end closure means for the reservoir outwardly of the bearing devices to prevent leakage of lubricant from the reservoir.

---

This invention relates to a roller bearing particularly adapted for use in mounting the digging wheel in excavating, trenching or analogous earth-working machinery.

It is aimed to provide novel construction wherein the moving parts are maintained better lubricated, which will give longer life, less trouble, require minimum upkeep and maintenance, stand heavier loads and more shocks for bouncing while working in rock or engaged in rough digging, and in which the parts are readily accessible for inspection and repair.

Another object is to provide a construction having a novel built-in lubricant reservoir.

One more object is to provide a cylinder or the equivalent surrounding the axle and mounted by anti-friction means having races one carried by the axle and another carried by the cylinder, the ends of the latter being closed and sealed to provide a lubricant reservoir.

Further objects are to provide a construction of novel and improved construction which may be readily assembled, adjusted and leakage of lubricant avoided.

Figure 1:
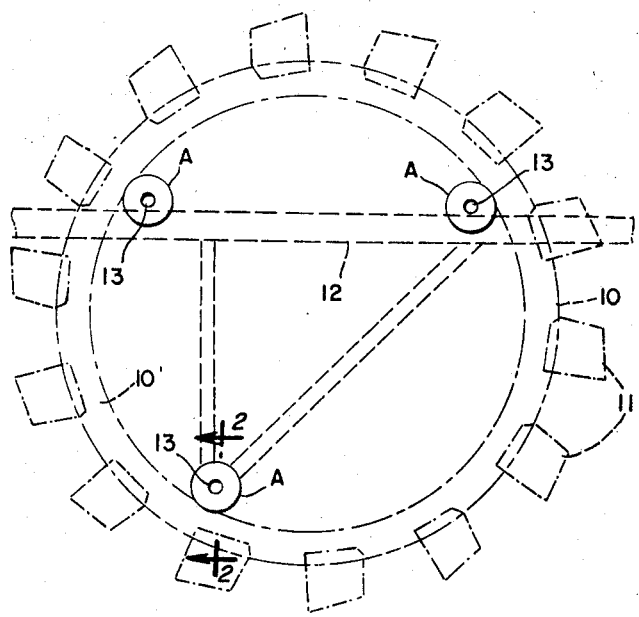
FIGURE 1 is a schematic view showing the use of the bearing in pluralities to support a driven rotatable digging wheel from the frame of a conventional excavating, trenching or analogous machine.
Figure 2:
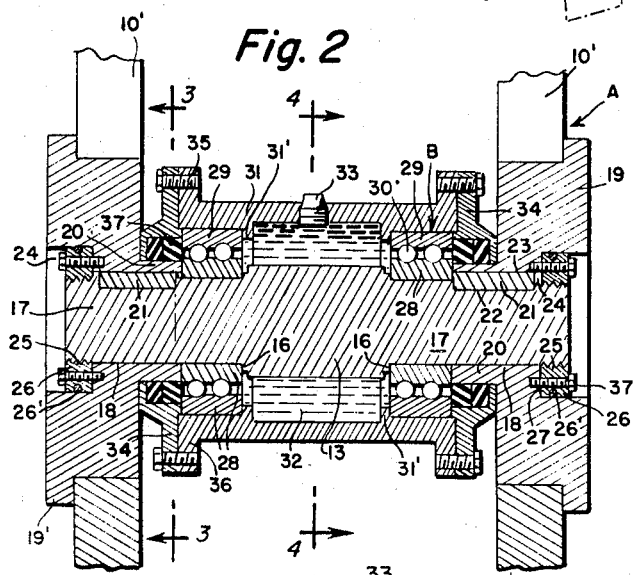
FIGURE 2 is a longitudinal sectional view on an enlarged scale taken through one of the improved bearings.
Figure 3:
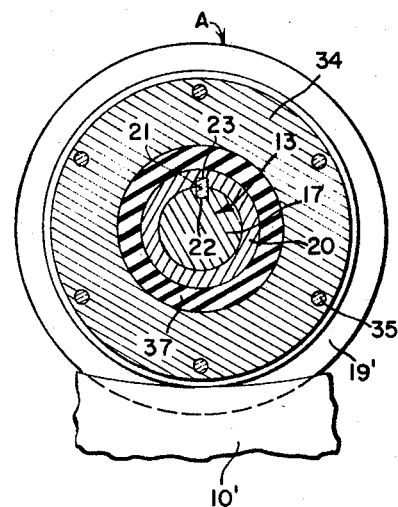
FIGURE 3 is a cross-sectional view taken on the line 3—3 of FIGURE 2.
Figure 4:
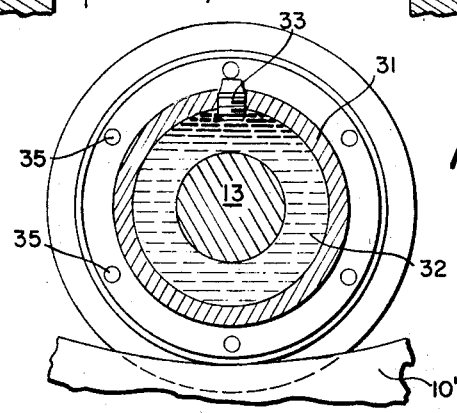
FIGURE 4 is a cross-sectional view taken on the line 4—4 of FIGURE 2.

Referring specifically to the drawings, a driven rotatable digging wheel of any conventional excavating, trenching or analagous machine is shown at 10, for instance, having suitable peripheral excavating diggers or buckets 11. The framework of such excavating machine is fragmentarily shown at 12 and suitably mounted thereon at spaced locations are supporting rollers A for said excavating wheel 10. The particular construction of the roller A constitutes my present invention. Said excavating wheel 10 usually comprises laterally spaced rings 10' connected together by said buckets in unitary relation.

All rollers A are alike and each comprises a shaft or axle 13. Shaft or axle 13 has angular shoulders or abutments 16 providing portions 17 of reduced diameter extending to the opposite ends thereof. Said portion 17 extend into central opening 18 of discs or wheels 19 having extended inner hub portions 20. Keys 21 occupy slots 22 in the peripheries of said portion 17 and longitudinal grooves 23 in the said hub portions and adjacent portions of the wheels fasten the axle and wheel against relative rotation. Wheels 19 have guide flanges 19' to overlap the rings at 10.

The ends of shaft 13 terminate in enlargements 24 of said openings 18 and have screw threads 25 engaged by those of ring or securing nuts 26 located in and abutting the inner wall 27 of the enlargements 24. Additionally, loosening of said nuts may be avoided by passing said screws 37 therethrough and threading them into the wheels 19. Nuts 26 have grooves receiving O-rings 26' to prevent lubrication from seeping out.

Anti-friction or ball-bearing devices B have their inner races 28 mounted on shaft portion 17 in abutment at opposite sides with adjacent shoulders 16 and hub portions 20. 29 are the outer races of said ball-bearing devices and balls between the races are designated 30.

Mounted on said outer races 29 is a cylinder or reservoir 31 adapted to contain a suitable lubricant in the nature of an oil or grease 32 for automatic flow between the various relatively movable surfaces to minimize friction; the lubricant being supplied through an opening of the cylinder closed by a removable screw plug 33. Although framework 12 may be mounted on the rollers A in any suitable way, mounting is usually made on the reservoirs 31 in any suitable manner. Reservoir 31 has inner flanges 31' for positioning contact with outer races 29.

Said hub extensions 20 also pass through central openings of end plates 34 bolted or fastened by screws 35 or otherwise to flanges 36 of the reservoir to close the ends thereof. Loss of oil from the reservoir through the bearing devices B and plates 34 is avoided since the latter have enlarged recesses in which oil seals 37 are mounted in contact with the peripheries of hub extensions 20.

In use it will be realized that the bearings directly support the digging or excavating rings 10' of the digging or excavating wheel 10 and that the wheel 10 rotates on the peripheries of the wheels 19, where the lubricant 32 will flow into the bearings B and adjacent moving surfaces to minimize friction, and also that the lubricant is sealed against loss as at 37.

Various changes may be made within the spirit and scope of the invention.

What is claimed is:

1. A supporting bearing for a driven rotatable digging wheel of an excavating machine comprising supporting rollers for said wheel, each of said rollers comprising an axle, a wheel mounted on each end portion of the axle and having inwardly extending hub portions provided with a central opening for receiving said end portions of the axle, said end portions of the axle having slots and said hub portions having grooves therein, keys received by said slots and grooves to fasten the axle and wheels against relative rotation, the central opening of each wheel terminating in an outermost enlargement for receiving the outer terminal parts of the axle and providing an inner outwardly facing wall for the enlargement, the terminal parts of the axle being screw threaded, nuts on each screw threaded portion of the axle located in said enlargements and abutting said inner wall, anti-friction bearing devices on end portions of said axle comprising inner races mounted on the end portions of the axle, outer races and balls between the races, a lubricant reservoir mounted on said outer races and communicating with said bearing devices, means on said reservoir for preventing inward longitudinal movement of the outer race on the axle, cooperating means on the axle and the hub portions of the wheel for preventing longitudinal movement of the inner race and the balls of the anti-friction devices in both directions, oil seals mounted on said hub portions of the wheels outwardly of the anti-friction device, and plates secured to the reservoir outwardly of the oil seals to retain the oil seals in place.

2. A supporting bearing as claimed in claim 1 in which said cooperating means comprises outwardly facing abutments on the axle and the inner end of the hub portion of each wheel, said plates and seals cooperate to prevent outward longitudinal movement of the outer races of the anti-friction devices.

3. A supporting bearing as claimed in claim 2 in which screws pass through openings in the nuts and are received by the outer wall of the hub portions of the wheels, said nuts have grooves therein and C-rings are received by said grooves.

References Cited

UNITED STATES PATENTS

| | | | |
|---|---|---|---|
| 1,355,652 | 10/1920 | Coppus et al. | 308—187 |
| 1,631,217 | 6/1927 | Matthews | 308—187 |
| 2,403,397 | 7/1946 | Rankin | 308—187 |

FOREIGN PATENTS

| | | |
|---|---|---|
| 377,585 | 7/1932 | Great Britain. |

EDGAR W. GEOGHEGAN, *Primary Examiner.*

FRANK SUSKO, *Assistant Examiner.*

U.S. Cl. X.R.

308—187.1